US008974595B2

(12) United States Patent
Guyot et al.

(10) Patent No.: US 8,974,595 B2
(45) Date of Patent: Mar. 10, 2015

(54) DRY COMPOSITION COMPRISING A BINDER AND A MODIFIED VEGETABLE OIL

(75) Inventors: Christophe Guyot, Bois-Guillaume (FR); Laurent Guillot, Vernon (FR)

(73) Assignee: Sika Technology AG, Baar (CH)

(*) Notice: Subject to any disclaimer, the term of this patent is extended or adjusted under 35 U.S.C. 154(b) by 0 days.

(21) Appl. No.: 13/218,275

(22) Filed: Aug. 25, 2011

(65) Prior Publication Data

US 2012/0055373 A1   Mar. 8, 2012

Related U.S. Application Data

(63) Continuation of application No. PCT/EP2010/052089, filed on Feb. 19, 2010.

(30) Foreign Application Priority Data

Feb. 26, 2009   (FR) ..................................... 09 00885

(51) Int. Cl.
*C04B 16/00* (2006.01)
*C04B 26/02* (2006.01)
*C04B 24/08* (2006.01)
*C04B 28/02* (2006.01)
*C04B 103/00* (2006.01)

(52) U.S. Cl.
CPC ............... *C04B 26/02* (2013.01); *C04B 24/08* (2013.01); *C04B 28/02* (2013.01); *C04B 2103/0075* (2013.01)
USPC .......................................... 106/724; 106/696

(58) Field of Classification Search
CPC .. C04B 16/00; C04B 24/08; C04B 2103/0075
USPC ................................................. 106/724, 696
See application file for complete search history.

(56) References Cited

U.S. PATENT DOCUMENTS

| | | | | |
|---|---|---|---|---|
| 5,262,089 A * | 11/1993 | Bobrowski et al. | ........... | 252/396 |
| 5,380,343 A * | 1/1995 | Hunter | ............................. | 44/302 |
| 5,730,029 A * | 3/1998 | Stoldt et al. | ...................... | 44/389 |
| 5,736,600 A * | 4/1998 | Karkare et al. | ................ | 524/400 |
| 5,763,508 A * | 6/1998 | Hess et al. | ......................... | 524/5 |
| 5,766,323 A | 6/1998 | Butler et al. | | |
| 5,873,936 A * | 2/1999 | Ogden | ......................... | 106/715 |
| 6,258,161 B1 * | 7/2001 | Kerkar et al. | ................. | 106/808 |
| 6,268,423 B1 | 7/2001 | Mayer et al. | | |
| 6,302,955 B1 * | 10/2001 | Kerkar et al. | ................. | 106/802 |
| 6,464,776 B1 | 10/2002 | Tsutsumi et al. | | |
| 6,537,366 B1 * | 3/2003 | Supplee, Sr. | ................... | 106/712 |
| 6,569,541 B1 | 5/2003 | Martin et al. | | |
| 6,761,765 B2 * | 7/2004 | Lu | ................................ | 106/823 |
| 6,797,753 B2 * | 9/2004 | Benecke et al. | ............... | 524/114 |
| 7,150,322 B2 * | 12/2006 | Szymanski et al. | ........... | 166/293 |
| 7,271,210 B2 * | 9/2007 | Bloom | .......................... | 524/313 |
| 7,410,538 B2 * | 8/2008 | Butler et al. | .................. | 106/806 |
| 7,763,572 B2 * | 7/2010 | Lewis et al. | ................... | 507/240 |
| 7,824,489 B2 * | 11/2010 | Szymanski et al. | ........... | 106/724 |
| 7,846,251 B2 * | 12/2010 | Aldykiewicz et al. | ........ | 106/696 |
| 8,506,700 B2 | 8/2013 | Guyot et al. | | |
| 8,580,030 B2 * | 11/2013 | Kanduth et al. | ............... | 106/802 |
| 8,603,241 B2 * | 12/2013 | Aldykiewicz et al. | ........ | 106/823 |
| 2001/0011112 A1 | 8/2001 | Langford | | |
| 2001/0023653 A1 | 9/2001 | Langford | | |
| 2005/0112267 A1 * | 5/2005 | Kian et al. | ..................... | 426/602 |
| 2006/0230987 A1 | 10/2006 | Burgals et al. | | |
| 2007/0287820 A1 * | 12/2007 | Weirich | ............................ | 528/1 |
| 2008/0015296 A1 * | 1/2008 | Bloom et al. | ................. | 524/313 |
| 2008/0216715 A1 | 9/2008 | Langford | | |

(Continued)

FOREIGN PATENT DOCUMENTS

| | | |
|---|---|---|
| EP | 1 661 874 A1 | 5/2006 |
| FR | 2 789 679 A | 8/2000 |

(Continued)

OTHER PUBLICATIONS

FR 2756464 A1 (Jun. 5, 1998) Duvert Abstract only.*
JP 2010037116 A (Nishi et al.) Feb. 18, 2010 abstract only.*
WO 200621792 (Szymanski et al.) Mar. 2, 2006, abstract only.*
DE 1267586 (Culemeyer et al.) May 2, 1968, abstract only.*
NL 6600824 (Jul. 29, 1966), abstract only.*
IN 76018 Chopra (Mar. 30, 1961), abstract only.*
FR 2870851 (Joubert et al. ) Dec. 2, 2005, abstract only.*
EP 678363 (Sers et al.), Oct. 25, 1995, abstract only.*
Written Opinion (PCT/ISA/237) issued on Mar. 26, 2010, by European Patent Office as the International Searching Authority for International Application No. PCT/EP2010/052090.
International Search Report (PCT/ISA/210) issued on Mar. 22, 2010, by European Patent Office as the International Searching Authority for International Application No. PCT/EP2010/052089.

(Continued)

*Primary Examiner* — Paul Marcantoni
(74) *Attorney, Agent, or Firm* — Buchanan Ingersoll & Rooney PC

(57) ABSTRACT

A dry composition including at least one binder and an oil comprising at least one compound of formula (I) below:

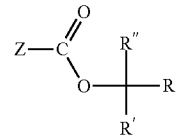

Formula (I)

wherein,
Z represents an optionally substituted, linear or branched $C_4$ to $C_{28}$ alkyl radical or an optionally substituted, linear or branched $C_4$ to $C_{28}$ alkenyl radical, and
R, R' and R" are identical or different and separately represent an optionally substituted, linear or branched hydrogen atom, hydroxyl radical, $C_1$ to $C_{12}$ alkyl radical, an optionally substituted, linear or branched $C_1$ to $C_{12}$ heteroalkyl radical, an optionally substituted, linear or branched $C_5$ to $C_{10}$ cycloalkyl radical, or an optionally substituted, linear or branched $C_6$ to $C_{18}$ aryl radical.

18 Claims, No Drawings

(56) References Cited

U.S. PATENT DOCUMENTS

| | | | |
|---|---|---|---|
| 2008/0319106 A1* | 12/2008 | Mercier et al. | 524/5 |
| 2009/0118397 A1* | 5/2009 | Bloom | 524/13 |
| 2012/0037044 A1 | 2/2012 | Guyot et al. | |
| 2012/0129746 A1* | 5/2012 | Benecke et al. | 508/501 |
| 2012/0298012 A1* | 11/2012 | Berke et al. | 106/801 |

FOREIGN PATENT DOCUMENTS

| | | | |
|---|---|---|---|
| JP | 6-122539 A | 6/1994 | |
| JP | 8-59315 A | 3/1996 | |
| JP | 08-073252 A | 3/1996 | |
| JP | 2008-502780 A | 1/2008 | |
| JP | 2008-239447 A | 10/2008 | |
| WO | WO 99/28264 A | 6/1999 | |
| WO | WO 00/34200 A1 | 6/2000 | |
| WO | 2006/002087 A2 | 1/2006 | |
| WO | WO 2006/084588 A2 | 8/2006 | |
| WO | WO 2008/062018 A1 | 5/2008 | |

OTHER PUBLICATIONS

Written Opinion (PCT/ISA/237) issued on Mar. 22, 2010, by European Patent Office as the International Searching Authority for International Application No. PCT/EP2010/052089.

Clyde E. Stauffer, "The Measurement of Surface Tension by the Pendant Drop Technique", The Procter and Gamble Company, Miami Valley Laboratories, Cincinnati, Ohio, Jun. 1965, pp. 1933-1938, vol. 69, No. 6.

Bayer Silicones Baysilone® Fluids M, Polymeric Dimethyl Siloxanes, Bayer AG Inorganics Business Group Silicones Business Unit Baysilone Marketing Section ((Jul. 1996).

International Search Report (PCT/ISA/210) issued on Mar. 26, 2010, by European Patent Office as the International Searching Authority for International Application No. PCT/EP2010/052090.

Written Opinion (PCT/ISA/237) issued on Mar. 26, 2010, by European Patent Office as the International Searching Authority for International Application No. PCT/EP2010/052090, with English translation.

Copending U.S. Appl. No. 13/217,705, filed Aug. 25, 2011, naming Christophe Guyot et al. as inventors, entitled "Dry Composition Comprising a Binder and a Silicone Oil".

International Preliminary Report on Patentability issued in connection with PCT International Application No. PCT/EP2010/052089, dated Aug. 30, 2011.

International Preliminary Report on Patentability issued in connection with PCT International Application No. PCT/EP2010/052090, dated Mar. 26, 2011.

An English Translation of the Notice of Reasons for Rejection issued Nov. 19, 2013, by the Japanese Patent Office in corresponding Japanese Patent Application No. 2011-551467. (5 pages).

R. Zambiazi et al., "Fatty Acid Composition of Vegetable Oils and Fats", B.Ceppa, Curitbia, vol. 25, No. 1, pp. 111-120, Jan./Jun. 2007.

* cited by examiner

DRY COMPOSITION COMPRISING A BINDER AND A MODIFIED VEGETABLE OIL

RELATED APPLICATION(S)

This application claims priority as a continuation application under 35U.S.C. §120 to PCT/EP2010/052089, which was filed as an International Application on Feb. 19, 2010 designating the U.S., and which claims priority to French Application 0900885 filed in France on Feb. 26, 2009. The entire contents of these applications are hereby incorporated by reference in their entireties.

FIELD

Disclosed is a dry composition comprising at least one binder and one oil comprising at least one compound of formula (I), which can enable a reduction in dust emissions, as well as to a method for preparing same.

The composition can be useful, for example, for preparing cement-based materials such as mortars, concretes and plasters, etc.

BACKGROUND INFORMATION

Cement-based dry or ready-to-use compositions for mortars or plasters are generally in the form of powdered products and are known to have a significant dust emission rate, e.g., during the manufacture, packaging or use thereof.

This dust emission poses health problems to the workers and the work conditions of same.

In addition, the dust soils the local environment in which the materials are stored or handled (factory or construction site).

Furthermore, the finest particles which blow away easily can be low-dose adjuvants or additives. Such being the case, these constituents are costly and play an important part in the composition or with regard to the properties of the end material. The blowing away of said constituents can modify the constitution of the composition and result in a loss of performance in the end material.

In addition, the fine particles of the compositions can be of a hygroscopic and/or electrostatic nature and can cause additional difficulties in implementing or using the dry compositions, e.g., problems of flowability, adhesion and "dust explosion" type risks.

In order to reduce dust emissions, "anti-dust" additives have been used in formulating the compositions.

For example, reference can be made to U.S. Pat. No. 6,464,776 which describes the use of polytetrafluoroethylene for limiting the dust emissions of cement or mortar compositions. However, these constituents promote the penetration of air into the composition, thereby altering the physicochemical properties of the material, whereby it is necessary to add additional defoaming agent additives.

International Publication No. WO 2006/084588 describes the use of hydrocarbon compounds as additives for reducing the dust produced by dry construction compositions.

However, among known additives, some are ineffective and obtaining a significant "anti-dust" effect requires considerable quantities of said additives.

In addition, some additives are costly and need to be prepared by constraining or difficult-to-implement methods.

In addition, some additives can impair the properties and performance of mortars or concretes and, for example, workability, strength, adhesive, and impermeability and durability properties.

Therefore, it would be beneficial to mitigate these failures and disadvantages of the related art. For example, it would be beneficial to provide dry compositions for cement-based materials which enable effective limitation of the emissions and blowing away of dust during the manufacture, transport or handling thereof. It would be beneficial to provide low-cost, practical and easy-to-use compositions which, for example, have good stability and flowability properties, etc. Furthermore, it would be beneficial to provide dry compositions which enable the obtainment of end materials having good physicochemical and particularly workability, durability and compressive strength properties.

SUMMARY

According to an exemplary embodiment, a dry composition is provided comprising at least one binder and an oil comprising at least one compound of formula (I) below:

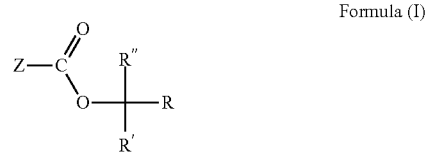

Formula (I)

wherein,

Z represents an optionally substituted, linear or branched $C_4$ to $C_{28}$ alkyl radical or an optionally substituted, linear or branched $C_4$ to $C_{28}$ alkenyl radical, and R, R' and R'' are identical or different and separately represent an optionally substituted, linear or branched hydrogen atom, hydroxyl radical, $C_1$ to $C_{12}$ alkyl radical, an optionally substituted, linear or branched $C_1$ to $C_{12}$ heteroalkyl radical, an optionally substituted, linear or branched $C_5$ to $C_{10}$ cycloalkyl radical, or an optionally substituted, linear or branched $C_6$ to $C_{18}$ aryl radical.

According to another exemplary embodiment, a method for preparing an exemplary composition is provided, the method comprising:

(i) preparing a mixture comprising at least one binder and/or at least one aggregate and/or at least one additive; and (ii) adding at least one oil comprising at least one compound of formula (I) to the mixture.

According to another exemplary embodiment, a method for preparing an exemplary composition is provided, the method comprising preparing a mixture which comprises at least one compound of formula (I), at least one binder, and optionally at least one agglomerate and/or at least one additive.

According to another exemplary embodiment, a method for preparing an exemplary composition is provided, the method comprising:

(i) preparing a first mixture comprising at least one oil comprising at least one compound of formula (I), and at least one binder and/or at least one aggregate and/or at least one additive;

(ii) preparing a second mixture comprising at least one binder and/or at least one aggregate and/or at least one additive; and (iii) adding the first mixture to the second mixture.

According to another exemplary embodiment, a method for preparing a cement grout, mortar, concrete, plaster, parging and/or screed is provided, the method comprising prepar-

DETAILED DESCRIPTION

Disclosed is a dry composition comprising at least one binder and an oil comprising at least one compound of formula (I) below:

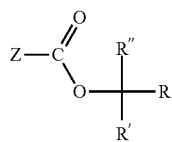

Formula (I)

wherein,

Z represents an optionally substituted, linear or branched $C_4$ to $C_{28}$ alkyl radical or an optionally substituted, linear or branched $C_4$ to $C_{28}$ alkenyl radical, and R, R' and R" are identical or different and separately represent an optionally substituted, linear or branched hydrogen atom, hydroxyl radical, $C_1$ to $C_{12}$ alkyl radical, an optionally substituted, linear or branched $C_1$ to $C_{12}$ heteroalkyl radical, an optionally substituted, linear or branched $C_5$ to $C_{10}$ cycloalkyl radical, and an optionally substituted an optionally substituted, linear or branched $C_6$ to $C_{18}$ aryl radical.

As disclosed herein, a "binder" can include a material which enables various elements to be bound together, such as sands, agglomerate and aggregates. For example, this may involve material binders (e.g., hydraulic binders) or organic binders (e.g., hydrocarbon binders).

As disclosed herein, an "inorganic binder" can include a binder including minerals which, when mixed with water, form a paste which hardens by agglomerating into aggregates. Among the inorganic binders, reference may be made to any binder known to a person skilled in the art, e.g., cement (e.g., aluminous, hydraulic, magnesia, metallurgical, super-sulfated or blended cement, blast furnace cement, slag cement, ash cement, pozzolanic cement, Portland cement or blended Portland cement), lime (quick, sintered, carbonated lime, fluorspar, fat lime, lean lime, hydraulic lime, slaked lime), plaster, clay and metakaolinite.

As disclosed herein, an "organic binder" can include a hydrocarbon binder, i.e., a hydrocarbon-based binder. Among organic binders, reference may be made to any binder known to a person skilled in the art, e.g., synthetic polymers.

Synthetic polymers, for example, can be in the form of a non-adhesive and/or redispersible dry powder and/or redispersible powder. These can involve, for example, thermoplastic polymers, thermosetting polymers, acrylic polymers, acrylic styrene polymers, epoxy polymers, polyurethane polymers, polymers containing ethylene, vinylene and/or vinyl acetate monomers, or polymers containing styrene and/or butadiene monomers.

In an exemplary embodiment, the binder can be selected from the group comprising cement, lime, plaster, clay, synthetic polymers, as defined above, for example, or a mixture thereof.

According to another exemplary embodiment, the binder can be selected from the group comprising cement, lime, synthetic polymers, as defined above, for example, or a mixture thereof.

As disclosed herein, an "alkyl radical" can include a carbon radical, which can be an optionally substituted, linear, branched or cyclic radical comprising 1 to 28 carbon atoms.

In the case of Z, the alkyl radical can be $C_4$ to $C_{28}$, e.g., $C_6$ to $C_{24}$, e.g., $C_{10}$ to $C_{22}$, e.g., $C_{16}$ to $C_{20}$.

In the case of R, R' or R", the alkyl radical can be $C_1$ to $C_{12}$, e.g., $C_1$ to $C_{10}$, e.g., $C_1$ to $C_8$.

As disclosed herein, an "alkenyl radical" can include a carbon radical having at least one double carbon-carbon bond, which can be linear, branched or cyclic and optionally substituted, comprising 2 to 28 carbon atoms.

In the case of Z, the alkenyl radical can be $C_4$ to $C_{28}$, e.g., $C_6$ to $C_{24}$, e.g., $C_{10}$ to $C_{22}$, e.g., $C_{16}$ to $C_{20}$.

In the case of R, R' or R", the alkenyl radical can be $C_2$ to $C_{12}$, e.g., $C_2$ to $C_{10}$, e.g., $C_2$ to $C_8$.

As disclosed herein, a "heteroalkyl radical" can include an alkyl radical as defined above, said alkyl system comprising at least one heteroatom, which can be selected, for example, from the group comprising sulfur, oxygen, nitrogen and boron.

As disclosed herein, an "aryl radical" can include a hydrocarbon radical comprising at least one ring satisfying Huckel's Rule of aromaticity. Said aryl can be optionally substituted and can include 6 to 18 carbon atoms, e.g., 6 to 10 carbon atoms.

As disclosed herein, a "cycloalkyl" can include an optionally substituted, cyclic, saturated or unsaturated carbon radical, which can include 5 to 10 carbon atoms.

The "substituted", for example, can designate the replacement of a hydrogen atom in a given structure by a radical selected from the group comprising, for example, an alkyl, alkenyl, heteroalkyl, aryl, heteroaryl, hydroxyl, amine, halogen, haloalkyl, etc. When more than one position can be substituted, the substituents can be the same or different at each position.

As disclosed herein, a "haloalkyl" can include an alkyl radical as defined above, said alkyl system comprising at least one halogen.

According to an exemplary embodiment, in formula (I), Z can represent a $C_4$ to $C_{28}$ alkenyl radical and R, R' and R", identical or different, can separately represent a hydrogen atom or a $C_1$ to $C_{12}$ linear or branched alkyl radical.

For example, in formula (I), the groups R and R' can represent a hydrogen atom, and the group R" can represent the —$C_3H_7$ radical or the —$CH(C_2H_5)$—$(CH_2)_3$—$CH_3$ radical.

According to an exemplary embodiment, the oil can be a modified vegetable oil.

As disclosed herein, a "modified vegetable oil" can include a natural vegetable oil which has undergone a treatment, e.g., extraction or chemical modification. For example, this may involve a triglyceride of natural origin (e.g., canola, walnut, linseed, sunflower, grape seed, peanut, corn, palm, safflower, sesame, soya seed, cocoa, cotton seed, mustard oil, etc.) which has been chemically modified, e.g., by a transesterification reaction with alcohol.

Besides the improved anti-dust effect thereof, the modified vegetable oil in the composition can have the advantage of being derived from agriculture and of being a renewable and environmentally friendly resource, as opposed to petroleum-derived oils, for example.

According to an exemplary embodiment, the oil can include the compound of formula (I) alone or mixed with other compounds. For example, the compound of formula (I) can be mixed with other different compounds of formula (I), for example with 1, 2, 3, 4, or 5 other compounds of formula (I), and/or with other compounds such as esters, for example (e.g., glycerol or fatty acid esters), alcohols (e.g., alcohols of generic formula R R' R" C—OH wherein R, R' and R" are as described above), diglycerides, triglycerides, or any product derived from secondary reactions or an incomplete reaction during modification of the vegetable oil, e.g., by transesterification.

For example, the oil can include at least 1% of the compound(s) of formula (I) by total weight of oil. It can also include, for example, at least 5% of the compound(s) of formula (I), e.g., at least 15%, e.g., at least 30%, e.g., at least 50% by total weight of oil.

For example, reference may be made to commercial modified vegetable oils, e.g., oils of the Estorob range (trademark), e.g., references Estorob 1214, Estorob 1292, Estorob 301.01, Estorob 804.01, Estorob 808.01, Estorob 926.65, or of the Lubrirob range (trademark), e.g., references Lubrirob 1214, Lubrirob 804.01, Lubrirob 808.01, Lubrirob 810.01, Lubrirob 926.55, Lubrirob 926.65, available from the Novance Company (France).

The composition according to an exemplary embodiment can be in the form of a powder. The particles of powder, for example, can have a diameter of up to 10 mm, e.g., from 10 nm to 10 mm, e.g., from 0.0001 to 5 mm, e.g., from 0.001 to 2 mm. For example, the composition according to the invention can include particles of powder of which more than 50% of the particles have a diameter of 0.001 to 10 mm.

The oil can have a surface tension less than 60 mN/m, e.g., less than 45 mN/m. According to an exemplary embodiment, the oil can have a surface tension less than 35 mN/m.

As disclosed herein, "surface tension" is understood to mean the tension existing at the separation surface between the oil and the particles of powder (solids). The surface tension enables characterization of the ability of the oil to wet the surface of the particles of powder. According to the Young-Dupré equation, the oil wets the solid particles all the more easily if the surface tension of the oil is weaker than that of the solid particles.

The surface tension of the oil, for example, can be determined by the pendant drop technique. See, for example, STAUFFER(C. E)—The measurement of the surface tension by the pendant drop technique. J. Phys. Chem. 69, 1965, pp. 1933-8.

According to an exemplary embodiment, the oil can have a dynamic viscosity lower than 1 Pa·s at 20° C., e.g., from 0.001 to 0.08 Pa·s at 20° C., e.g., from 0.001 to 0.05 Pa·s at 20° C.

According to an exemplary embodiment, "dynamic viscosity" is understood to mean the physical property of the oil which characterizes the constraint produced by a shearing force in the oil.

The dynamic viscosity of the oil, for example, can be determined by the method of standard NF EN is 0 2555 or ISO 3104.

According to an exemplary embodiment, the oil can have a surface tension lower than 45 mN/m and a dynamic viscosity lower than 0.1 Pa·s at 20° C.

The dust of which it is desired to limit or reduce the emission, can include fine (light) particles contained in the dry composition. In a completely surprising manner, it was observed that a suitable choice of the surface tension and viscosity of the oil enabled the anti-dust effect of the composition to be improved. As a matter of fact, a suitable choice for these parameters can, for example, enable the emission and flying away of the fine particles in the form of dust while at the same time reducing or preventing the formation of undesirable agglomerates, e.g., agglomeration with large particles capable of impairing the implementation of the dry composition of the invention and the performance thereof (e.g., the flowability and adhesive properties of same) and/or the performance of the mortars or materials obtained from the dry composition (workability, mechanical strength, adhesion).

As disclosed herein, "fine particles" are understood to mean particles having a diameter less than 50 μm, e.g., less than 32 μm. As disclosed herein, "large particles" are understood to mean particles having a diameter greater than 50 μm.

According to an exemplary embodiment, the oil content in the composition can be from 0.05 to 5% by weight of the composition, e.g., from 0.1 to 5%, e.g., from 0.1 to 1%, e.g., from 0.2 to 1%.

The composition can have a binder content of 5 to 95% by weight of the composition, e.g., from 10 to 80%, e.g., from 15 to 50%.

According to an exemplary embodiment, the composition can further include at least one aggregate, selected, for example, from the group comprising sand, ground brick, gravel, grit, alumina, bauxite, calcined bauxite, crushed flint, or any natural or synthetic aggregate (e.g., wood, rubber, polystyrene). A person skilled in the art will be capable of selecting the aggregate to be used according to the targeted use.

For example, the composition can have an aggregate content of 5 to 95% by weight of the composition, e.g., from 20 to 90%, e.g., from 50 to 85%.

An "aggregate" can include a solid particle or an agglomerate of solid particles of natural or synthetic origin, which is intended to be part of the composition of materials intended for construction, structures or the building of civil engineering structures. The aggregate can have a diameter ranging from 1 μm to 10 mm, e.g, from 100 μm to 10 mm. Among usable aggregates, reference can be made, for example, to pebbles, gravel (having a particle size of 2 to 10 mm), coarse sand (having a particle size of 0.5 to 2 mm), fine sand (having a particle size of 100 to 500 μm), silt, fines (likewise called filler).

As disclosed herein, "fine" (or "filler") can include a fine aggregate, e.g., having a particle size less than 125 μm.

According to an exemplary embodiment, the aggregate can be a siliceous, limestone, sand-lime, aluminous or alumina-silicate aggregate.

According to an exemplary embodiment, the composition can further include an additive selected from the group comprising fly ash, a water-repellent or waterproofing agent, a carboxylic acid salt, a resin, a retarding adjuvant, an accelerating adjuvant, an air-entraining agent, a defoaming agent, a rheology modifying agent, and any other usable adjuvant or additive known to a person skilled in the art. A person skilled in the art will be capable of selecting the additive according to the targeted use. Said additives can advantageously be in the form of a powder or in a form compatible with the introduction of same into a dry composition.

An additive can include a constituent or product added to a composition and enabling particular characteristics and properties to be obtained for said composition, e.g., enabling modification of the setting time of the material, preservation, modification of viscosity and workability, improvement of the mechanical strength and impermeability, and/or prevention of the growth of microorganisms.

Among air-entraining agents and defoaming agents, reference can be made, for example, to a detergent, a wetting agent, a dispersing agent and an emulsifier. For example, these can involve anionic surfactants, cationic surfactants, zwitterionic or amphoteric surfactants, non-ionic surfactants (e.g., a sucrose ester, sorbitol, a polyethylene glycol ester, a fatty acid ester, an ethoxylated or any other non-ionic surfactant described, for example, in patent application EP 1 661 874).

Among the water-repellent or waterproofing agents, reference can be made, for example, to a fatty acid ester, a silicone derivative, a PTFE (polytetrafluoroethylene) derivative.

Among the carboxylic acid salts, reference can be made, for example, to an amino resin derived from urea (e.g., melamine).

Among the retarding adjuvants (a compound having a retarding effect on the setting of cements, mortars or other materials), reference can be made, for example, to gluconates, citric acid, tartaric acid, the salts thereof, amino resins or other retarding adjuvants described, for example, in patent application EP 1 661 874.

Among the accelerating agents, reference can be made, for example, to the salts of formate, thiocyanate, nitrate, NaCl, $CaCl_2$, aluminum hydroxide, alumina, triethanolamine, triisopropanolamine, etc.

Among the rheology modifiers, reference can be made, for example, to cellulose ethers, gums (e.g., xanthan, guar, gellan, etc.), starches, starch ethers, polyvinyl alcohol, water-soluble polyacrylates, colloidal silica, polymers or copolymers (an acetate-versatate copolymer, styrene-acrylic copolymer, polyvinyl acetate copolymer, acrylic copolymer, ethylene-vinylene-acetate terpolymers), but also water-reducing agents like melamine and the derivatives thereof, polynaphthalene and the derivatives thereof, polycarboxylates and casein.

The total content of additive(s) in the composition can be from 0.01 to 20% by total weight of the composition, e.g., from 0.05 to 15%, e.g., from 0.1 to 10%.

According to an exemplary embodiment, the composition can include:

at least one oil comprising at least 1% of the compound of formula (I), with a total oil content of 0.05 to 5% by weight of the composition, at least one binder with a total binder content of 5 to 95% by weight of the composition, at least one aggregate with a total aggregate content of 5 to 95% by weight of the composition, and at least one additive with a total additive content of 0.1 to 20% by weight of the composition.

According to an exemplary embodiment, a method for preparing a composition is disclosed, wherein:

(i) a mixture is prepared comprising at least one binder and/or at least one aggregate and/or at least one additive, (ii) at least one oil comprising at least one compound of formula (I) is added to the mixture obtained in (i).

An exemplary embodiment relates to a method for preparing a composition wherein a mixture is preparing comprising at least one oil comprising at least one compound of formula (I), at least one binder, and optionally at least one aggregate and/or at least one additive.

An exemplary embodiment relates to a method for preparing a composition wherein:

(i) a mixture is prepared comprising at least one oil comprising at least one compound of formula (I), and at least one binder and/or at least one aggregate and/or at least one additive;

(ii) a mixture is prepared comprising at least one binder and/or at least one aggregate and/or at least one additive; (iii) the mixture obtained in (i) is added to the mixture obtained in (ii).

An exemplary embodiment relates to the use of a composition, for example, for preparing cement grout, mortar, concrete, plaster, parging and/or screed.

An exemplary embodiment relates to the use of a composition, for example, for construction, structures, concrete repair, the protection of concrete and steel against inclement weather or external events, waterproofing, anchoring, bonding, sealing, adhering roof tiles or floor tiles, and facing.

Other exemplary advantages will become further apparent to a person skilled in the art upon reading the following examples.

EXAMPLES

In the following examples, the "anti-dust" agent designates an oil comprising at least one compound of formula (I).

Example 1

Compositions (1a) and (1b)

The compositions (1a) and (1b) are dry compositions for mortar the proportions of constituents of which are provided in the following table 1 (in % by total weight of the dry composition):

TABLE 1

| Example of a composition | |
|---|---|
| Cement | 40% |
| (CEM I 52.5 N CE PMES CP2 NF marketed by the Lafarge Company, France) | |
| Siliceous sand | 45% |
| (Sable SB marketed by the Fulchiron Company, France) | |
| Sand-lime filler | 12.1% |
| (Stone powder, marketed by the Piketty Company) | |
| Aceteate-versatate copolymer | 1.5% |
| (Elotex MP2080, marketed by the Elotex Company) | |
| Calcium formate | 0.7% |
| (marketed by the Lanxess Company) | |
| "Anti-dust" agent | 0.7% |

The two compositions (1a) and (1b) were made with the proportions provided below, with the following modified vegetable oils as an "anti-dust" agent:

composition (1a) comprising 0.7% modified vegetable oil marketed under the reference Lubrirob 804.01 by the Novance Company (France).

composition (1b) comprising 0.7% modified vegetable oil marketed under the reference Lubrirob 808.01 by the Novance Company (France).

The characteristics of the modified vegetable oils used as an "anti-dust" agent in the compositions (1a) and (1b) are provided in table 2 below:

TABLE 2

| Characteristics of the modified vegetable oils in compositions | | |
|---|---|---|
|  | Lubrirob 804.01 | Lubrirob 808.01 |
| Viscosity at 20° C. (in Pa · s) | 0.004 | 0.015 |
| Surface tension (in mN/m) | 30 | 29 |

The two modified vegetable oils Lubrirob 804.01 and Lubrirob 808.01 are derived from the transesterification of a canola oil by an alcohol (butanol for the Lubrirob 804.01 oil and 2-ethyl-hexane-1-ol ($HO-CH_2-CH(C_2H_5)-(CH_2)_3-CH_3$) for the Lubrirob 808.01 oil).

They include, in particular, compounds of formula (I) wherein:

group Z is a $C_{18}$ alkenyl radical, groups R and R' are hydrogen atoms and group R" is the alkyl radical $-H_3H_7$ (for the "L804.01" oil or the alkyl radical $-CH(C_2H_5)-(CH_2)_3$ (for the "808.01" oil).

Operating Procedure:

The compositions (1a) and (1b) were prepared as follows:
(i) the sand, filler, cement and adjuvants are mixed;
(ii) the anti-dust agent is added to the preceding mixture and everything is mixed together.

Example 2

Compositions (2a) and (2b)

The compositions (2a) and (2b) are dry compositions for mortar the proportions of constituents of which are provided in table 3 below (in % of total weight of the dry composition):

TABLE 3

| Example of a composition | |
|---|---|
| Cement (CEM II/A LL 42.5 R CE PM-CP2 NF, marketed by the Calcia Company, France) | 30% |
| Siliceous sand (Sable SB marketed by the Fulchiron Company, France) | 61% |
| Siliceous fine (or "filler") (Silica S5 marketed by the Fulchiron Company, France) | 2.74% |
| Fly ash (Condensil S75, marketed by the Sika Company) | 2.5% |
| Acetate-versatate copolymer (Vinnapas 5011, L marketed by the Wacker Company) | 2% |
| Fatty acid ester (Axilat DF6352DD, marketed by the Hexion Company) | 0.2% |
| Polypropylene Fibers (Crackstop 6 mm, marketed by the Bonar Company) | 0.1% |
| Melamine (Sikament FF86, marketed by the Sika Company) | 0.06% |
| Calcium formate (marketed by the Lanxess Company) | 0.07% |
| "Anti-dust" agent | 0.7% |

The two compositions (2a) and (2b) were made with the proportions provided below, with the following modified vegetable oils as an "anti-dust" agent:
composition (2a) comprising 0.7% modified vegetable oil marketed under the reference Lubrirob 804.01 by the Novance Company (France).
composition (2b) comprising 0.7% modified vegetable oil marketed under the reference Lubrirob 808.01 by the Novance Company (France).

Operating Procedure:

The compositions (2a) and (2b) were prepared as follows:
(i) the sand, filler, cement and adjuvants are mixed;
(ii) the anti-dust agent is mixed with the preceding mixture and everything is mixed together.

Example 3

Measurement of the "Anti-Dust" Effect of the Exemplary Compositions and Comparative Examples a) Compositions (1a), (1b), (1c), (1d), (1e) and (1f)

Four compositions (1a), (1b), (1c), (1d) and (1e) were made with various "anti-dust" agents as well as a composition (1f), or "control" composition not comprising any "anti-dust" agent:

composition (1a) according to the invention comprising 0.7% modified vegetable oil, Lubrirob 804.01 (or "L 804.01");

composition (1b) according to the invention comprising 0.7% modified vegetable oil, Lubrirob 808.01 (or "L 808.01");

composition (1c) (prepared according to the operating procedure of example 1) comprising 0.7% unmodified vegetable oil (edible canola oil VITA D'OR (trademark), marketed by the CARGILL OIL Company, Belgium);

composition (1d) (prepared according to the operating procedure of example 1) comprising 0.7% unmodified vegetable oil (edible sunflower oil, marketed by the BOUTON d'OR Company, Belgium);

composition (1e) (prepared according to the operating procedure of example 1) comprising 0.7% linoleic acid (EDENOR SB 05™), marketed by the Emery Oleachemicals Company, Germany).

composition (1f) (prepared according to the operating procedure of example 1), not comprising any "anti-dust" agent.

Unlike the modified vegetable oils Lubrirob 804.01 and Lubrirob 808.01 which primarily include compounds of formula (I), as described in example 1, the two unmodified natural vegetable oils (canola and sunflower) primarily include triglycerides composed of $C_{18}$ alkenyl radicals.

The test carried out to measure the dust emission of a mortar consists in filling a 100-ml flask with 65 g of dry mortar and in manually shaking the sealed flask 10 times. Once the agitation has stopped, the flask is opened quickly. The dust emission is then evaluated through the dust that is released from the opening of the flask. The dust emission is classified on a scale ranging from 1 to 4 (1 corresponding to a very low dust emission, 4 corresponding to a very high dust emission).

The results obtained are listed in table 4 below:

TABLE 4

| | Comparison of dust emission | | | | | |
|---|---|---|---|---|---|---|
| | Composition | | | | | |
| | (1a) (L804.01) | (1b) (L808.01) | (1c) (canola oil) | (1d) (sunflower oil) | (1e) (linoleic acid) | (1f) (control) |
| Dust emission | 1 | 1 | 3 | 3 | 4 | 4 |

The exemplary compositions (1a) and (1b) enable a significant reduction in dust emission compared with the control composition (1f) which does not include any "anti-dust" agent.

In addition, the compositions (1a) and (1b) according to the invention which include a modified vegetable oil are indeed more efficient in terms of reducing dust emission than the homologous compositions (1c), (1d) and (1e) which do not include any unmodified vegetable oil or linoleic acid.

b) Compositions (2a), (2b), (2c), (2d), (2e) and (2f)

Four compositions (2a), (2b), (2c), (2d) and (2e) were made with various "anti-dust" agents, as well as a composition (2f), or "control" composition not comprising any "anti-dust" agent:

composition (2a) according to the invention comprising 0.7% modified vegetable oil, Lubrirob 804.01 (or "L 804.01");

composition (2b) according to the invention comprising 0.7% modified vegetable oil, Lubrirob 808.01 (or "L 808.01");

composition (2c) (prepared according to the operating procedure of example 2) comprising 0.7% unmodified vegetable oil (edible canola oil VITA D'OR (trademark), marketed by the CARGILL OIL Company, Belgium);

composition (2d) (prepared according to the operating procedure of example 2) comprising 0.7% unmodified vegetable oil (edible sunflower oil, marketed by the BOUTON d'OR Company, Belgium);

composition (2e) (prepared according to the operating procedure of example 2) comprising 0.7% linoleic acid (EDENOR SB 05™), marketed by the Emery Oleachemicals Company, Germany).

composition (2f) (prepared according to the operating procedure of example 2), not comprising any "anti-dust" agent.

The test carried out for measuring the dust emission for these 5 compositions was carried out as before.

The results obtained are listed in table 5 below:

TABLE 5

Comparison of dust emission (2)

| | Composition | | | | |
|---|---|---|---|---|---|
| (2a) (L804.01) | (2b) (L808.01) | (2c) (canola oil) | (2d) (sunflower oil) | (2e) (linoleic acid) | (2f) (control) |
| Dust emission | | | | | |
| 1 | 1 | 3 | 3 | 4 | 4 |

The compositions (2a) and (2b) enable a significant reduction in dust emission compared with the control composition (2f) which does not include any "anti-dust" agent.

In addition, the results show a much more significant reduction in dust emission in the case of compositions (2a) and (2b), which include a modified vegetable oil, than in the case of the homologous compositions (2c), (2d) and (2e), which do not include any unmodified vegetable oil or linoleic acid.

Example 4

Evaluation of the Performance of Mortars

For these tests, the five compositions prepared according to example 3.a) were evaluated and prepared.

These performance tests were carried out on hardened mortars prepared from the dry mortar compositions (1a), (1b), (1c) and (1d) to which water was added in the amount of 12.5% by total weight of dry powder. The samples of mortar were evaluated after 28 days of hardening.

The following tests were carried out:

Compressive strength test (measurement carried out according to the EN 12190 test standard).

Flexural strength test (measurement carried out according to the EN 12190 test standard)

Adhesion test (measurement carried out according to the EN 1542 test standard).

Shrinkage test (measurement carried out according to the EN 12617-4 test standard).

The results of these tests are listed in table 6 below:

TABLE 6

Comparison of mortar performance

| Composition | (1a) (L804.01) | (1b) (L808.01) | (1c) (canola oil) | (1d) (sunflower oil) | (1f) (control) |
|---|---|---|---|---|---|
| Compressive strength at 28 days (MPa) | 46 | 42 | 36 | 37 | 49 |
| Flexural strength at 28 days (MPa) | 8.5 | 8.2 | 6 | 6.3 | 8 |
| Adhesion at 28 days (MPa) | 0.9 | 1.0 | 1.0 | 0.95 | 1.0 |
| Free shrinkage at 28 days (μm/m) | −1145 | −1150 | −1150 | −1200 | −1450 |

These results show that the mortars obtained with the compositions of the invention (compositions (1a) and (1b)) have very good performance levels. For example, the compressive strength and flexural properties are markedly improved in comparison with the compositions (1c) and (1d). In addition, the adhesive and free shrinkage properties are comparable to those of compositions (1c) and (1d).

In addition, the performance levels of the mortars derived from compositions (1a) and (1b) are not degraded in comparison with the mortar derived from the control composition (1f). The free shrinkage properties are even improved in comparison with the control composition (1f). In this way, while still enabling a reduction in dust emission, the exemplary compositions, which include modified vegetable oil, enable very good performance levels to be maintained, which are comparable to those of the control composition (which does not include any "anti-dust" additive).

Example 5

Measurement of the "Anti-Dust" Effect

The following compositions were prepared:

composition (1a) according to the invention, comprising 0.7% modified vegetable oil, Lubrirob 804.01 (prepared according to the operating procedure of example 1), control composition (1f) which does not include any "anti-dust" agent, (prepared according to the operating procedure of example 1), composition (1g) prepared by sieving the control composition (1f), thereby eliminating particles having a diameter of less than 32 μm.

The dust emission of each of these three compositions was measured according to the test described in example 3. The results obtained are listed in table 7 below:

TABLE 7

Characteristics of the "anti-dust" effect

| Composition | (1a) (L804.01) | (1f) (control) | (1g) (control sieved at 32 μm) |
|---|---|---|---|
| Dust emission | 1 | 4 | 1 |

As already observed in example 3, the composition (1a) enables a significant reduction in dust emission compared with the control composition (1f) which does not include any "anti-dust" agent.

In addition, these results show that the composition (1a) has a reduced dust emission comparable to that of composition (1g), from which the particles having a diameter of less than 32 μm were eliminated by sieving.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A dry composition comprising at least one binder and a chemically modified vegetable oil, wherein the vegetable oil is chemically modified by transesterification with an alcohol, the chemically modified vegetable oil comprising at least one compound of formula (I) below:

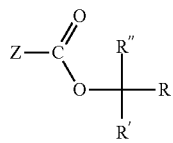

Formula (I)

wherein,

Z represents an optionally substituted, linear or branched $C_4$ to $C_{28}$ alkyl radical or an optionally substituted, linear or branched $C_4$ to $C_{28}$ alkenyl radical, and R is a hydrogen atom, R' is a hydrogen atom, and R" is —$C_3H_7$ or —$CH(C_2H_5)$—$CH_2)_3$—$CH_3$, wherein the at least one binder includes a hydraulic cement, wherein the oil has a surface tension less than 60 mN/m, wherein the oil has a dynamic viscosity lower than 0.1 Pa·s at 20° C.

2. The composition according to claim 1, wherein, in formula (I), Z represents a $C_4$ to $C_{28}$ alkyl radical.

3. The composition according to claim 1, wherein the composition is in the form of a powder.

4. The composition according to claim 1, wherein the oil content is from 0.05 to 5% by weight of the composition.

5. The composition according to claim 1, wherein the binder further comprises one selected from the group consisting of a lime, plaster, clay, synthetic polymer and a mixture thereof.

6. The composition according to claim 1, wherein the binder further comprises one selected from the group consisting of a lime, synthetic polymer and a mixture thereof.

7. The composition according to claim 1, wherein the binder content is from 5 to 95% by weight of the composition.

8. The composition according to claim 1, further comprising at least one aggregate selected from the group consisting of a sand, stone powder, crushed brick, gravel, grit, alumina, bauxite, calcined bauxite, crushed flint, and a natural or synthetic aggregate.

9. The composition according to claim 8, wherein the aggregate content is from 5 to 95% by weight of the composition.

10. The composition according to claim 8, wherein the aggregate is a siliceous, limestone, sand-lime, aluminous or alumino-silicate aggregate.

11. The composition according to claim 1, further comprising an additive selected from the group consisting of a fly ash, water-repellent or waterproofing agent, carboxylic acid salt, resin, retarding agent, accelerating agent, air-entraining agent, defoaming agent and rheology modifying agent.

12. A method for preparing the composition according to claim 1, the method comprising:
   (i) preparing a mixture comprising at least one binder and/or at least one aggregate and/or at least one additive; and
   (ii) adding at least one oil comprising at least one compound of formula (I) to the mixture.

13. A method for preparing the composition according to claim 1, the method comprising mixing at least one compound of formula (I), at least one binder, and optionally at least one agglomerate and/or at least one additive.

14. A method for preparing the composition according to claim 1, the method comprising:
   (i) preparing a first mixture comprising at least one oil comprising at least one compound of formula (I), and at least one binder and/or at least one aggregate and/or at least one additive;
   (ii) preparing a second mixture comprising at least one binder and/or at least one aggregate and/or at least one additive; and
   (iii) adding the first mixture to the second mixture.

15. A method for preparing a cement grout, mortar, concrete, plaster, parging and/or screed, the method comprising preparing a cement grout, mortar, concrete, plaster, parging and/or screed with the composition according to claim 1.

16. The composition according to claim 1, wherein the composition is suitable for use in construction, structures, concrete repair, protection of concrete and steel against inclement weather or external events, waterproofing, anchoring, bonding, sealing, adhering roof tiles or floor tiles, and facing.

17. The composition according to claim 2, wherein the composition is in the form of a powder.

18. A method for reducing a dust emission of a dry composition, the method comprising:
   adding a chemically modified vegetable oil to a dry composition comprising at least one binder, wherein the vegetable oil is chemically modified by transesterification with an alcohol,
   wherein the chemically modified vegetable oil comprises at least one compound of formula (I) below:

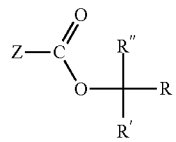

Formula (I)

wherein,

Z represents an optionally substituted, linear or branched $C_4$ to $C_{28}$ alkyl radical or an optionally substituted, linear or branched $C_4$ to $C_{28}$ alkenyl radical, and R is a hydrogen atom, R' is a hydrogen atom, and R" is —$C_3H_7$ or —$CH(C_2H_5)$—$CH_2)_3$—$CH_3$, wherein the at least one binder includes a hydraulic cement, wherein the oil has a surface tension less than 60 mN/m, wherein the oil has a dynamic viscosity lower than 0.1 Pa·s at 20° C.,
wherein the addition of the oil to the dry composition is effective to reduce a dust emission of the dry composition.

* * * * *